US007366605B2

(12) United States Patent
Schueler et al.

(10) Patent No.: US 7,366,605 B2
(45) Date of Patent: Apr. 29, 2008

(54) METHOD AND DEVICE FOR CONTROLLING AND/OR REGULATING AN INTERNAL COMBUSTION ENGINE

(75) Inventors: Matthias Schueler, Steinheim (DE); Michael Kessler, Weissach (DE); Mohamed Youssef, Nuefringen (DE); Arnold Engber, Steinheim an der Murr (DE); Axel Loeffler, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/584,089

(22) Filed: Oct. 20, 2006

(65) Prior Publication Data

US 2007/0106449 A1 May 10, 2007

(30) Foreign Application Priority Data

Oct. 26, 2005 (DE) ...................... 10 2005 051 519
Jan. 11, 2006 (DE) ...................... 10 2006 001 374

(51) Int. Cl.
*G06F 17/00* (2006.01)
*G05D 1/00* (2006.01)

(52) U.S. Cl. ..................... 701/103; 73/35.06; 180/65.2

(58) Field of Classification Search ................ 701/103, 701/111, 114, 87; 73/35.03, 35.06, 35.09, 73/35.11; 180/65.2, 65.3, 65.4, 65.5
See application file for complete search history.

(56) References Cited

U.S. PATENT DOCUMENTS

| | | | | |
|---|---|---|---|---|
| 6,287,237 | B1 * | 9/2001 | Graf et al. | 477/94 |
| 6,820,592 | B2 * | 11/2004 | Buck et al. | 123/435 |
| 7,072,752 | B2 * | 7/2006 | Acker et al. | 701/38 |
| 7,216,029 | B2 * | 5/2007 | Blankenhorn et al. | 701/103 |
| 7,231,289 | B2 * | 6/2007 | Damitz et al. | 701/104 |

FOREIGN PATENT DOCUMENTS

| | | |
|---|---|---|
| DE | 103 05 656 | 1/2004 |

* cited by examiner

*Primary Examiner*—Willis R. Wolfe
*Assistant Examiner*—Johnny H. Hoang
(74) *Attorney, Agent, or Firm*—Kenyon & Kenyon LLP

(57) ABSTRACT

A device and a method for controlling and/or regulating an internal combustion engine, in particular an internal combustion engine having direct injection. A regulation adjusts a combustion state variable, that characterizes the combustion state, to a setpoint value. A control and/or a regulation influences a torque variable that characterizes the torque of the internal combustion engine and/or the noise variable that characterizes the noise of the internal combustion engine, using a control variable.

10 Claims, 3 Drawing Sheets

METHOD AND DEVICE FOR CONTROLLING AND/OR REGULATING AN INTERNAL COMBUSTION ENGINE

FIELD OF THE INVENTION

The present invention relates to a method and a device for controlling and/or regulating an internal combustion engine, in particular an internal combustion engine having direct injection.

BACKGROUND INFORMATION

A method and a device for controlling an internal combustion engine are described in German Patent No. DE 10305656. In the method described there, various characteristic variables are ascertained starting from signals of a structure-borne vibration sensor, which are used for the regulation of the internal combustion engine.

In the control and/or regulation of an internal combustion engine, especially a Diesel internal combustion engine, partially homogeneous and/or homogeneous combustion methods are used, which are characterized by a high exhaust gas recirculation rate in combination with an injection modified in comparison to conventional combustion for the achievement of a large ignition delay. Such partial homogeneous and homogeneous combustion methods are designated below as homogeneous combustion methods, or the corresponding operating state is designated as homogeneous operation.

What is problematic in such homogeneous combustion methods is that in response to transient processes, such as operation type switchovers or sudden load changes within the homogeneous operation, discontinuous curves with respect to engine torque and/or noise are able to occur. A common characteristic in these partial homogeneous and homogeneous combustion methods is that, compared to conventional combustion methods, greatly increased exhaust gas recirculation rates occur. For design reasons, this leads to charge compositions that are different from cylinder to cylinder, even at stationary operation. Conditioned upon manufacturing tolerances and aging effects of the fuel injectors and the overall system, this results in the taking of very different courses in combustion, which, in turn, cause very different pollutant emissions and noise emissions, individual to each cylinder.

Especially problematical is the stabilization of transient processes, such as a sudden load change, within a homogeneous operating range or an operating mode switchover between the conventional operation and a homogeneous operation.

SUMMARY OF THE INVENTION

According to the present invention, it was recognized that this is substantially based on the fact that the air system reacts substantially slower than the injection system. This means that, in response to a change in a setpoint value, the injection system, especially the injection quantity and/or the start of injection react very rapidly to changes, whereas the air quantity reacts only slowly to such changes. If, for example, there is suddenly an additional load demand, a rapid adjustment of the fuel quantity results in a lack of air. This, in turn, leads to, from a late delayed combustion up to misfirings, and thus to a decrease in the torque output. If, however, a load reduction occurs, an excess of air occurs temporarily, since there is still sufficient air available. This leads to an early combustion having a high pressure gradient, and thus to a great noise output.

Regulation of a combustion state essentially takes place given a specified setpoint value. A second regulation controls the torque of the internal combustion engine and the noise of the internal combustion engine to specified setpoint values. Now, according to the present invention, it is provided that the controllers for the torque variable and for the noise variable do not have an effect on a separate actuating variable, but that their output signals are used to correct the combustion state regulator. The output variables of these two controllers are used, in particular, for the correction of the setpoint value, the actual value and/or the output variable of the combustion state controller.

It is furthermore especially advantageous if the torque controller and the noise controller are designed not for regulation but for control. This means that in this case an actual variable is not required. It is moreover advantageous if a precontrol is superposed on at least the combustion state controller and the noise controller. This applies especially when the noise controller acts on an actuating variable of its own, for instance, the fuel quantity injected during a preinjection.

It is also especially advantageous that the setpoint values for the regulation and the control variables are filtered in such a way that the response with time of the air system is taken into account. This means, the setpoint values for the controllers and the precontrol values are filtered in such a way that the inertia in time of the air system with respect to the fuel system is taken into consideration. For this purpose, this filtering takes place both for the setpoint values and the control values, if only a control takes place.

In this connection it is particularly advantageous that the torque controller does not act on the fuel quantity, but only changes the torque indirectly via the combustion state controller and its actuating variable. The noise controller acts directly on the noise via its own actuating variable, such as, for instance, the preinjection quantity and/or indirectly via the combustion state control loop.

DETAILED DESCRIPTION

Figure 1:
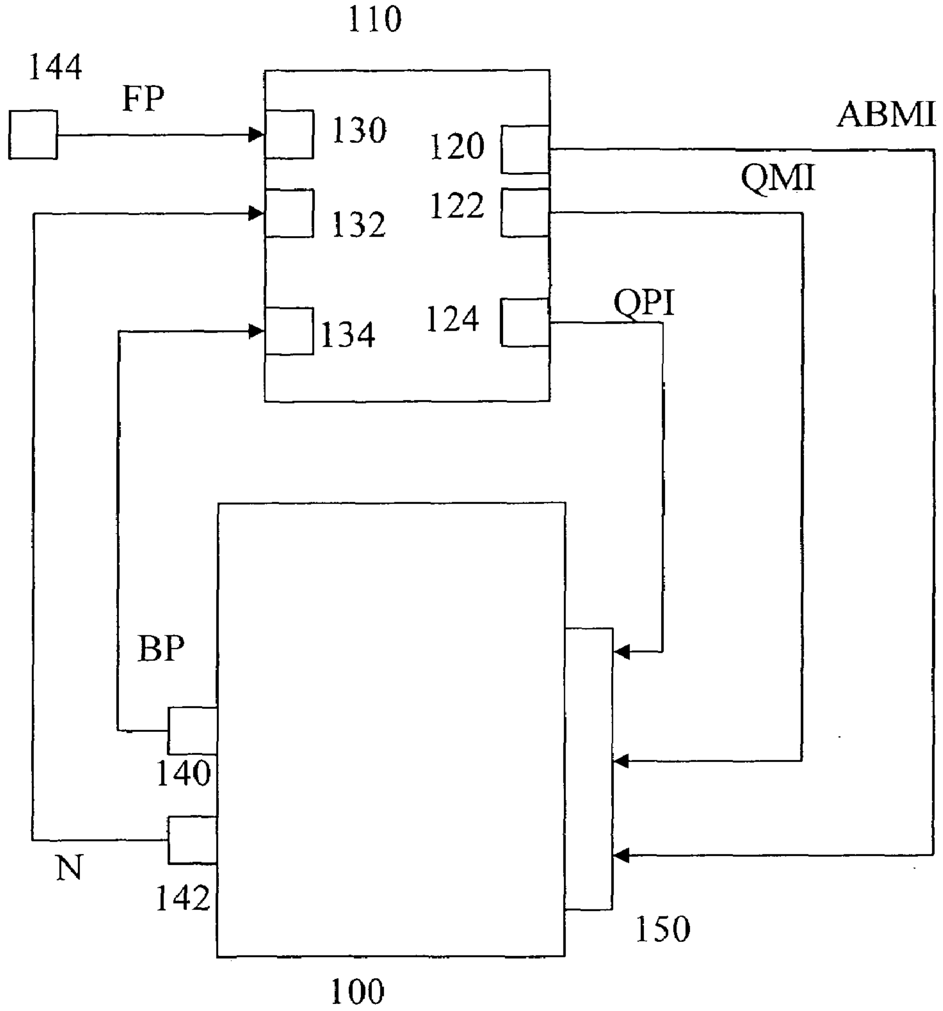
FIG. 1 shows an embodiment of the device according to the present invention.

FIG. 1 shows the important elements of the device according to the present invention as a block diagram. An internal combustion engine is designated by 100 and a control unit by 110. Control unit 110 includes a first output 120, which acts upon an actuating element 150 using a first control variable ABMI. Control unit 110 also includes a second output 122, which acts upon actuating element 150 using a second actuating variable QM1. Furthermore, control unit 110 includes a third output 124, which specifies a third control variable QPI for acting upon actuating element 150.

In the case of the first control variable ABMI, for example; the control beginning of a main injection is involved, in the case of second control variable QMI, the fuel quantity metered in by the main injection is involved, and in the case of third control variable QPI, the fuel quantity measured in during the preinjection is involved. Using these variables, actuating element 150 is acted upon.

Actuating element 150 is preferably developed as a fuel injector controlled by a magnetic valve or by a piezo actuator. The actuating element meters in desired fuel quantity QMI at desired point in time ABMI, as a function of the control variable with which the actuating element is acted upon. For this, the actuating element is furnished with an output stage which is preferably a part of control unit 110. As a function of the control variables, this output stage determines appropriate control signals to act upon the actuating element, that is, the piezo actuator or the magnetic valve. Actuating element 150 is assigned to the internal combustion engine, in this instance, and meters to it the appropriate fuel quantity.

Control unit 110 also includes a first evaluation 130, a second evaluation 132 and a third evaluation 134. In the first evaluation, output signal FP of a sensor is supplied, which signals the driver's intention (command). Second evaluation 132 processes a signal N, which characterizes the operating state of the internal combustion engine. For this, for example, rotary speed N of the internal combustion engine is evaluated. Rotary speed N is recorded using a second sensor 142, which is situated on the internal combustion engine. A third evaluation 134 evaluates signal BP of a first sensor 140, which is equivalent to the combustion chamber pressure. Sensors 140 and 142 are preferably situated on the internal combustion engine.

Besides these sensors and these control variables, additional sensors and/or control variables may also be provided. Moreover, various sensor signals and/or control variables may be replaced by other control variables and/or other sensor signals. For instance, instead of a combustion chamber pressure sensor, a sensor may be used which perceives the structure-born vibration emissions of the combustions.

Starting from the input variables, such as especially the driver's intention and/or rotary speed N of the internal combustion engine, control unit 110 computes fuel quantity QMI to be injected for the main injection. This quantity essentially determines the torque made available by the internal combustion engine. Via output 122, this quantity arrives at actuating element 150, which meters in the corresponding fuel quantity to the internal combustion engine. Furthermore, starting from various signals, such as that of the combustion chamber pressure, the state of combustion and the noise emission are ascertained. Starting from these variables, control unit 110 ascertains various control variables for influencing the noise emission and/or the combustion state. This ascertainment of these quantities is shown in detail in FIG. 2.

Figure 2:
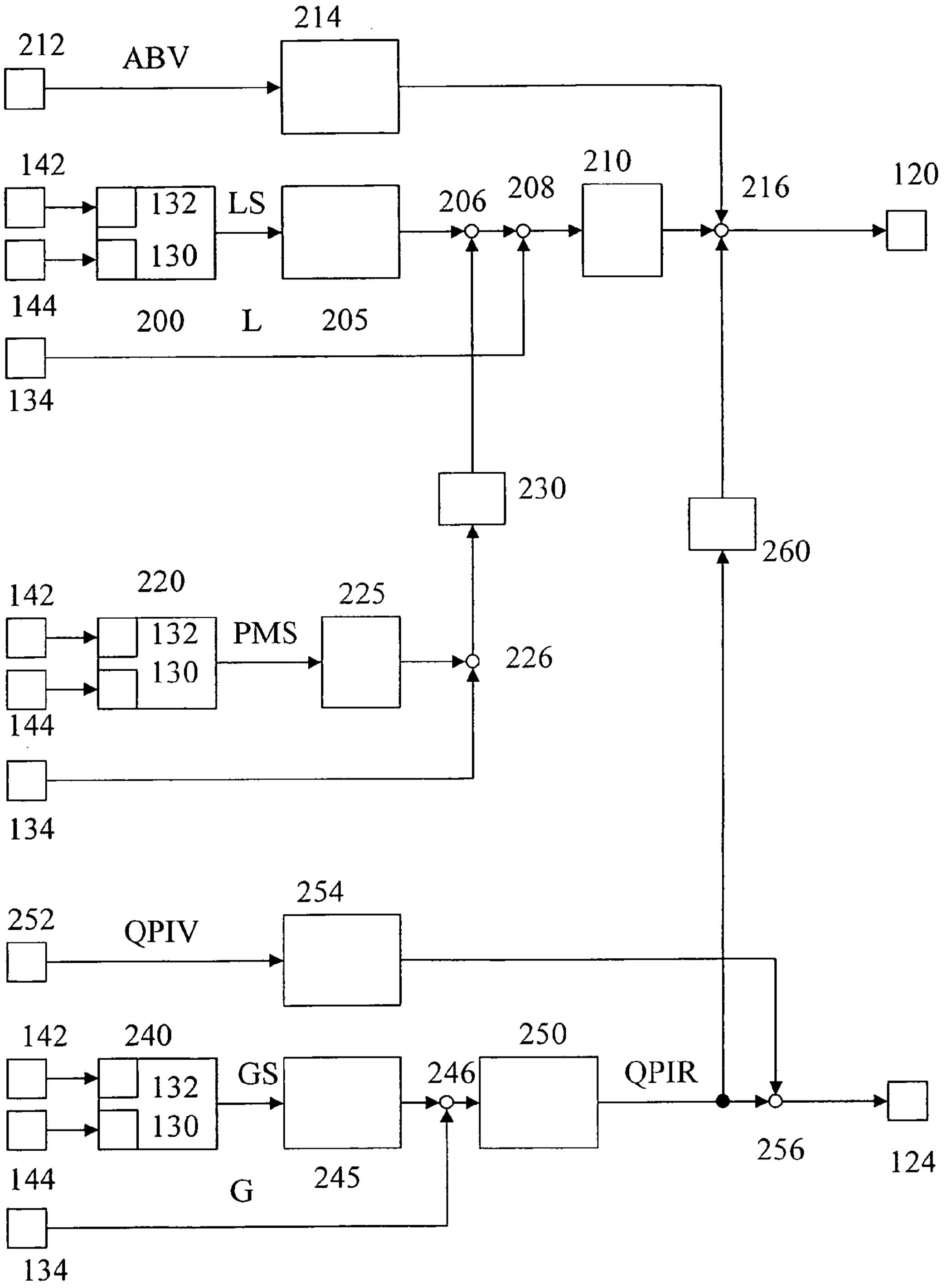
FIG. 2 shows an embodiment of the device according to the present invention.

The variables already described in FIG. 1 are marked with corresponding reference numerals in FIG. 2. Starting from operating characteristics variables, such as rotary speed N and driver's intention FP, a first setpoint value specification 200 computes a setpoint value LS for the combustion state of the main injection. Via filtering 205, setpoint value LS arrives at a node 206. The output signal of node 206 arrives at a state controller 210 via a node 208. At the second input of node 208, actual value L for the combustion state is present. This is made available by third evaluation 134. The third evaluation computes the actual value for the combustion state, preferably starting from combustion pressure signal BP, which is made available by first sensor 140. The output signal of state controller 210 arrives at first output 120 via a node 216. State controller 210 makes available a signal which influences the control beginning of main injection ARMI. Present at the second input of node 216 is the output signal of a second pressure filter 214. Filter 214 was acted upon by the output signal of a precontrol 212. Output signal ABV of precontrol 212 corresponds to the precontrol value for the control beginning of the main injection. This value is preferably specified starting from various operating characteristics values of the internal combustion engine and from environmental conditions.

At nodes 206 and 216, the signals are preferably linked additively to one another, that is, the corresponding signals are added to one another. Node 208 ascertains the difference between setpoint value LS and actual value L for the combustion state. State controller 210 specifies such a value that actual value L approaches setpoint value LS for the combustion state. The state controller preferably uses the control beginning of the main injection as the actuating variable.

A second setpoint value specification is denoted by reference numeral 220. It specifies a setpoint value PMS for the torque that the internal combustion engine is supposed to make available. This specification of the setpoint value by setpoint value specification 220 preferably takes place starting from the driver's intention and the rotary speed of the internal combustion engine. Output signal PMS of second setpoint value specification 220 arrives at a node 226 via a third filter 225. Actual value PMI for the supplied torque is present at the second input of node 226. The actual value PMI for the torque is preferably also specified by evaluation 134. That means, the torque is also ascertained starting from the combustion chamber pressure signal of first sensor 140. The output signal of node 226, which corresponds to the deviation between the setpoint value and the actual value, is applied to torque controller 230. This, in turn, is applied to node 206, using an appropriate signal which is developed in such a way that the actual value approaches the setpoint value.

Starting from the actual torque and the filtered setpoint value for the torque, controller 230 computes a correcting value for the setpoint value of the combustion state. This means that torque controller 230 influences the torque of the internal combustion engine only via the combustion state. Alternatively and/or in addition, it may also be provided that torque controller 230 engages with (acts on) the actual value or the system deviation, that is, the output signal of node 208 or the output signal of controller 210. For instance, it may also be provided that the torque controller specifies a correcting value for the control beginning of the main injection, which is superposed on the output signal of state controller 210 at node 216.

A third setpoint value specification is designated as 240 which specifies a setpoint value GS for the noise emission, starting from the driver's intention FP and rotary speed N. This setpoint value GS arrives at node 246 via a fourth filter 245. Actual value G for the noise emission is present at the second input of node 246. This actual value G for the noise emission is preferably made available also by third evaluation 134. The output signal of node 246, which corresponds to the system deviation, that is, the difference between setpoint value and actual value for the noise emission, is applied to noise controller 250. This output signal QPIR arrives at node 216 via an adjustment element 260. Furthermore, the output signal of the noise controller arrives at output 124 via a node 256. At the second input of node 256, the output signal of a fifth filter 254 is present, at whose input signal QPIV is present. Signal QPIV is made available by a noise precontrol 252. As a function of the operating state of the internal combustion engine, this noise precontrol specifies a signal QPIR which corresponds to the fuel quantity that is to be injected during the preinjection. In node 256 the precontrol signal and the output signal of noise controller 250 are preferably superposed additively. Moreover, the noise controller engages with the control beginning of the main injection via a node.

A combustion state controller is provided according to the present invention, which specifies a signal for influencing the control beginning of the main injection, as a function of the difference between a setpoint value and an actual value for the combustion state. Moreover, a torque controller and a noise controller are provided, which adjust the actual value for the noise and the torque to a specified setpoint value. In this instance, these two controllers correct the combustion state controller in such a way that they engage with the setpoint value and/or the actuating variable of combustion state controller 210. It is preferably provided that the torque controller only engages via the combustion state controller. The noise controller is developed in such a way that it can also engage the preinjection quantity, that is, the noise controller engages the noise via the combustion state controller and/or via the preinjection quantity. For this combination of the three controllers, and accurate control of the internal combustion engine is also possible in dynamic operating states.

It is especially advantageous if the noise controller engages with other actuating variables which have an influence on the noise emissions of the internal combustion engine Such a variable is, for example, the exhaust gas recirculation. That is, the noise controller specifies a variable which engages the proportion of the recirculated exhaust gas. This means that output 124 specifies a control variable for the air system of the internal combustion engine. And, output 124 specifies a correcting value for the correction of the control variable of the air system. This means the noise controller alternatively or additionally also engages other actuating variables for the preinjection quantity, especially variables of the air system, such as, preferably, the exhaust gas recirculation rate.

The extensive decoupling of the influence variable represents a substantial aspect. The torque is stabilized via the intervention in the combustion state, and the noise is stabilized via the intervention in the preinjection quantity and/or other control variables. The cross-influence of the preinjection quantity on the combustion state is made milder by correction 260.

The effect of the shift in the combustion state is essentially that the poor efficiency of a very late, delayed combustion is avoided, and thus the torque is stabilized. On the other hand, the preinjection has an effect, above all, on the pressure gradient, and thus a great one on the noise dynamics. In one simplified specific embodiment it may also be provided that the intervention takes place in the combustion state, that is, in the beginning of the main injection or only by the intervention in the injection quantity of the preinjection. That means, it may also be provided that the torque controller engages with the preinjection quantity.

An important contribution to the design approach to the object that the regulation is stabilized under dynamic conditions is implemented by filter means 205, 214, 225, 245 and/or 254. These filter means preferably include filters of the first or second order. These dynamic properties of the filters correspond essentially to the dynamics of the air system. That means, the filters adapt the corresponding setpoint values and precontrol values to the dynamic response of the air system. This is particularly advantageous since irregularities in the torque or the noise result substantially from the response of the air system which is delayed in comparison to the injection system.

The actual value PMI for the average induced torque may be specified, starting from various quantities, by evaluation 134. In the specific embodiment shown in FIG. 2, the specification takes place starting from a combustion chamber pressure sensor 140. This combustion chamber pressure sensor records the pressure in one or more of the cylinders of the internal combustion engine. Instead of this quantity, other variables may be used too. In particular, the amplitude of the boost pressures and/or the thrust-corrected ignition frequency oscillations may be used. The appropriate variable is then computed starting from rotary speed N.

Actual value G for the noise emission is also able to be made available starting from different input variables and different methods. Thus, starting from the combustion chamber pressure, according to different methods, different features can be gathered which are able to be used as actual value for the noise emission. Furthermore, starting from other variables, such as, for instance, from a structure-borne vibration sensor, the computation of the features that characterize the noise emission may be used. It is particularly advantageous if the actual value is ascertained, starting from a plurality of characteristics variables. This means that the specific embodiment, shown in FIGS. 1 and 2, is only to be regarded as a specific embodiment in which the actual value determination can also take place based on other variables that are not shown. The variables shown should be regarded only as examples. The same applies also to the control variables. Thus, the state controller and the noise controller may also engage with other control variables, which influence the combustion state and the noise emission.

Furthermore, alternatively to a controller structure according to FIG. 2, an adaptation may be carried out. In such an additive regulation, the continuity is valued only after the transition of a dynamic process, subsequently an operating point-dependent and/or an operating type-dependent adaptation of the parameters of the filters taking place. That means, state controller 210, torque controller 230 and/or noise controller 250 engage with the appropriate filter means. Thus it is provided, for example, that noise controller 250 acts upon fifth filter means 254 in such a way that, in response to the next dynamic procedure, the setpoint value and the actual value for the noise emission coincide. That means, noise controller 250 engages only and/or alternatively with filter means 254. Filter means 254 then corrects precontrol value QPIV in such a way that the setpoint value and the actual value nearly coincide. In this case, the intervention of noise controller 250 via node 256 or via node 246 may be omitted. The equivalent also holds true for the state controller. That means, state controller 210 and torque controller 230 influence the transmission response of second filter 214 in such a way that the setpoint value and the actual value for the combustion state and the torque are brought into agreement.

Figures 3A, 3B, 3C, 3D, 3E, 3F, 3G:
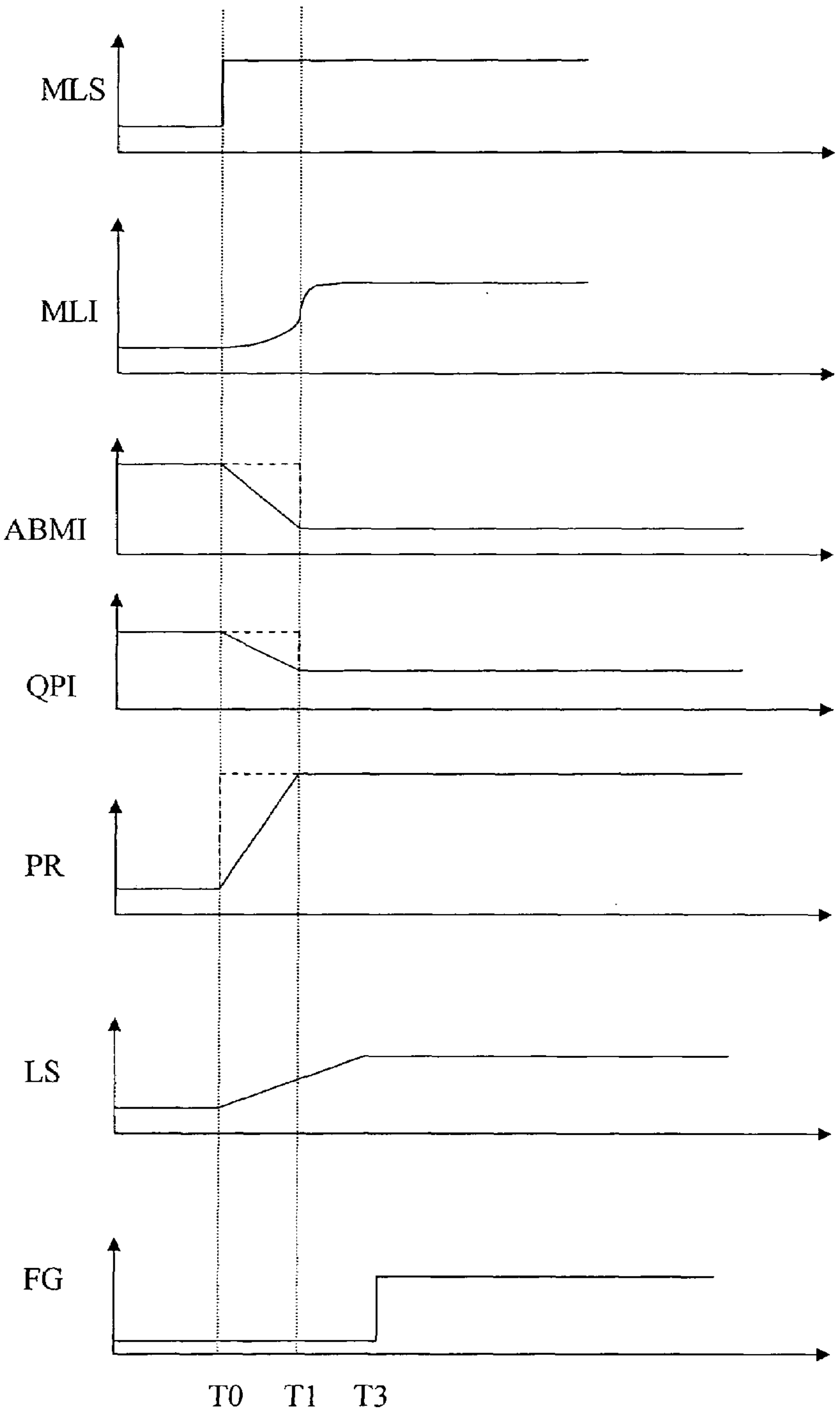
FIGS. 3A-3G show various signals plotted over time.

In FIGS. 3A-3G, various signals are plotted versus time. A first point in time TO is present when an operating state is changing. In FIG. 3A the setpoint value for air quantity MLS is plotted, and in FIG. 3B actual value MLI for the air quantity is plotted. In FIG. 3C the beginning of the control of the main injection ABMI is plotted; in FIG. 3D the quantity QPI of the preinjection is plotted; in FIG. 3E the rail pressure PR is plotted; in FIG. 3F the setpoint value LS of the combustion state is plotted; and in FIG. 3G a release signal FG is plotted. If, at point in time TO, setpoint value MLS for the air quantity changes, actual value MLI for the air quantity goes over to its new value only in a delayed manner, because of the dynamics of the air system. This new value is reached at point T1. In the figures, the curves of the corresponding signals without filtration are shown in dashed lines, and with the filtering according to the present invention they are shown in a solid line. In this context, the curves are selected in exemplary fashion, and other curves may equally well set in. That means, the value for the beginning of control of the main injection, and the value for the quantity of the preinjection do not abruptly go from the old to the new value, but go over to the new value according to a specified filtered function. In this context, a linear transition is shown in the figures. Another transition value could perfectly well be provided. After termination of the procedure, when all values are again at their stable value, the release signal for the adaptation is output at point in time T.

What is claimed is:

1. A method for at least one of controlling and regulating an internal combustion engine, comprising:

adjusting, using a regulation, a combustion state variable, that characterizes a combustion state, to a setpoint value;

influencing, using at least one of a control and a regulation, at least one of (a) a torque variable that characterizes a torque of the internal combustion engine and (b) a noise variable that characterizes a noise of the internal combustion engine, using a control variable; and filtering at least one of (c) setpoint values and (d) control variables in such a way that a response over time of an air system is taken into consideration.

2. The method according to claim 1, wherein the internal combustion engine is a direct-injecting internal combustion engine.

3. The method according to claim 1, wherein a control variable that influences the torque acts upon the regulation of the combustion state variable.

4. The method according to claim 1, further comprising correcting the setpoint value for the combustion state using a control variable that influences the torque.

5. The method according to claim 1, wherein a control variable that influences the noise acts upon the regulation of the combustion state variable.

6. The method according to claim 5, further comprising correcting a control variable for a combustion state quantity using the control variable that influences the noise.

7. The method according to claim 5, further comprising controlling an actuating variable that influences the noise of the internal combustion engine using the control variable that influences the noise.

8. The method according to claim 1, further comprising superposing a precontrol upon a controller.

9. A device for at least one of controlling and regulating an internal combustion engine, comprising:

a first regulation device for adjusting a combustion state variable, that characterizes a combustion state, to a setpoint value;

at least one of a control device and a second regulation device for influencing at least one of (a) a torque variable that characterizes a torque of the internal combustion engine and (b) a noise variable that characterizes a noise of the internal combustion engine, using a control variable; and an arrangement adapted for filtering at least one of (c) setpoint values and (d) control variables in such a way that a response over time of an air system is taken into consideration.

10. The device according to claim 9, wherein the internal combustion engine is a direct-injecting internal combustion engine.

* * * * *